March 12, 1957  J. ISE, JR., ET AL  2,784,799
GAS RECOVERY SYSTEM
Filed March 26, 1954  2 Sheets-Sheet 2

INVENTORS.
JOHN ISE JR.
GEORGE P. MILLBURN
BY
Roland A. Anderson
ATTORNEY.

United States Patent Office 2,784,799
Patented Mar. 12, 1957

2,784,799

GAS RECOVERY SYSTEM

John Ise, Jr., Berkeley, and George P. Millburn, Concord, Calif., assignors to the United States of America as represented by the United States Atomic Energy Commission Application March 26, 1954, Serial No. 419,123

5 Claims. (Cl. 183—4.7)

The present invention relates to a gas recovery system and, more particularly, to a system for recovering $He^3$ from a particle accelerator.

It has been found that deuterons can be accelerated to an energy of about 190 m. e. v. in a synchro-cyclotron, whereas doubly ionized $He^3$ ions can be accelerated to an energy of about 510 m. e. v. in the same accelerator. Such accelerated $He^3$ ions are then stripped to provide deuterons of about 340 m. e. v. The advantage gained in energy of the deuterons is readily apparent; however, to achieve the latter method it is necessary to provide $He^3$ at the ion source of the accelerator. In practice a supply of helium enriched with $He^3$ is utilized and the expense thereof increases with the degree of enrichment. For usable external (of the accelerator) deuteron currents helium enriched to 95 percent $He^3$ has been found necessary. Because of the high cost of such gas, a very efficient recovery system of the continuous flow type is necessary.

It is therefore an object of the present invention to provide an efficient gas recovery system.

Another object of the invention is to provide a gas recovery system of the continuous flow type.

A further object of the invention is to provide a gas recirculating system having a purifier incorporated.

Still another object of the invention is to provide a gas recirculating system which operates below atmospheric pressure and is protected against sudden increases in pressure by a control to isolate the system.

Figure 1:
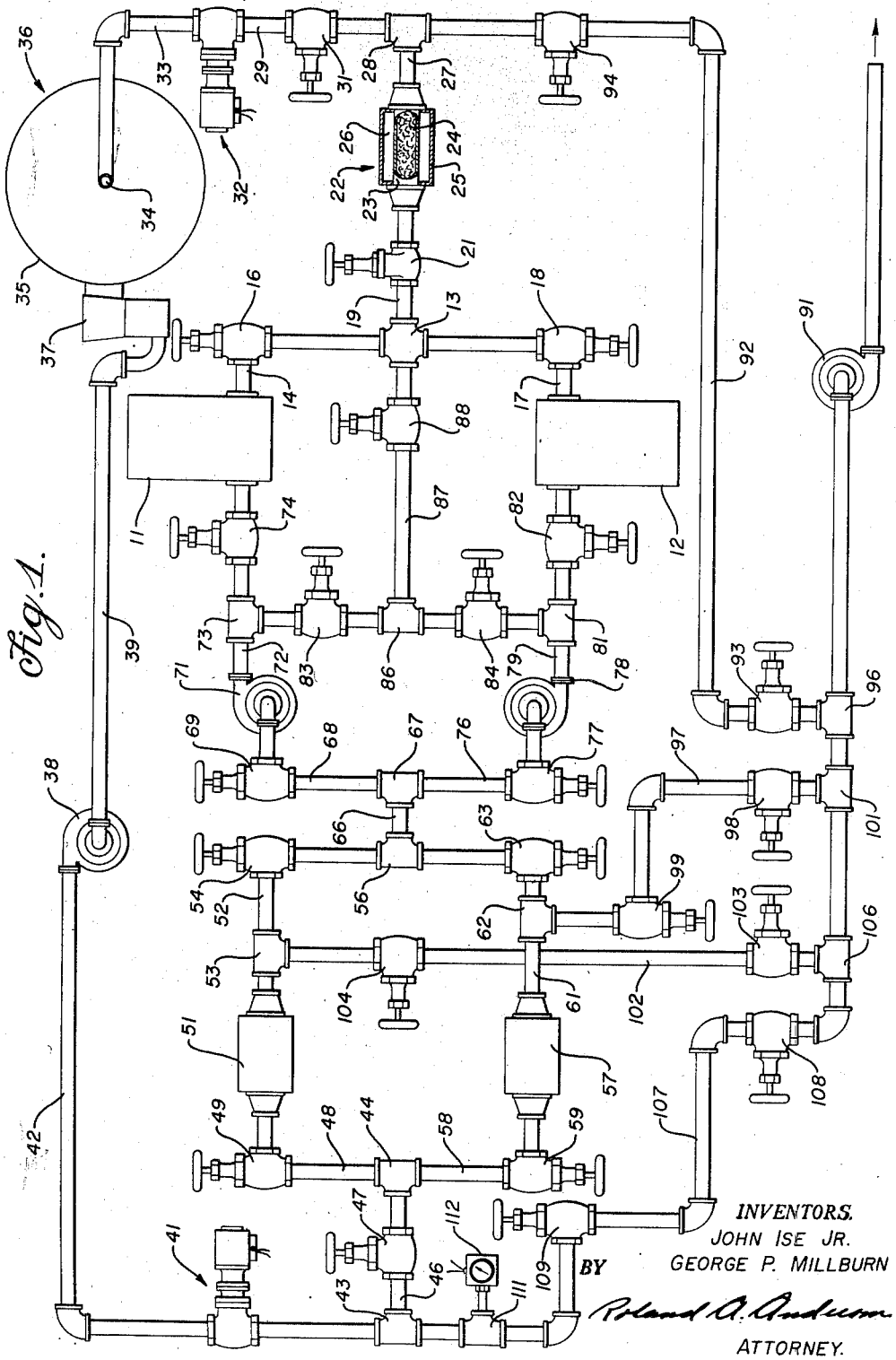
Figure 2:
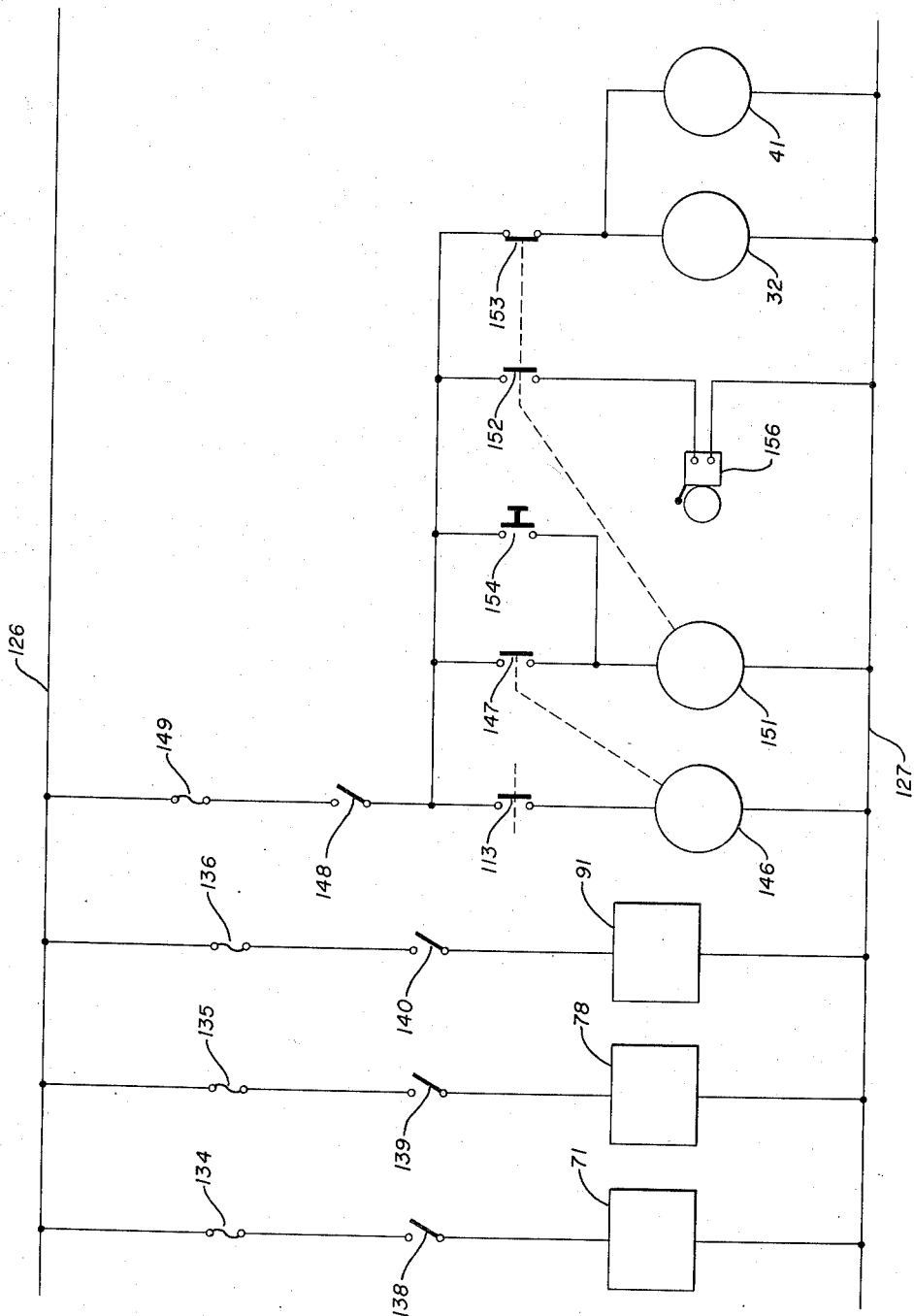

Other objects and advantages of the invention will be apparent in the following description and claims considered together with the accompanying drawing in which:

Figure 1 is a plan view of the invention as utilized with a synchro-cyclotron; and Figure 2 is a schematic diagram of the control circuit of the system of Fig. 1.

Referring to the drawing in detail, Fig. 1 in particular, there are provided two storage tanks 11 and 12 for gas. Such tanks 11 and 12 may contain the same gas or a gas enriched to differing percentages. One opening of a cross fitting 13 is connected by a pipe 14 having a mechanical valve 16 to an opening of one tank 11. Another opening of the fitting 13 is similarly connected to the other tank 12 by a pipe 17 and mechanical valve 18. A third opening of the fitting 13 is connected by a pipe 19 having a needle valve 21 to the inlet end of a charcoal trap 22 which is utilized to remove oil vapor from the gas passing therethrough.

The charcoal trap 22 is conventional and comprises a tube 23 packed with activated charcoal 24, the adsorption properties of which are well known in the art. A jacket 25 surrounds the tube 23 and provides a chamber 26 into which a coolant, such as liquid nitrogen, may be placed. A heating jacket (not shown) may be utilized to drive out the adsorbed contaminants when the trap 22 becomes saturated.

The outlet end of the trap 22 is connected by a pipe 27 to one opening of a T fitting 28. A second opening of such T fitting 28 is connected by a length of pipe 29 containing a mechanical valve 31 to a first safety solenoid valve 32. The other side of the safety valve 32 is connected by a pipe 33 to the filament ion source 34 located substantially at the center of the vacuum tank 35 of a synchro-cyclotron 36. The structural details and operation of such a cyclotron 36 are set forth at length in U. S. Patent 2,615,129 entitled Synchro-Cyclotron and issued to Edwin M. McMillan October 21, 1952. Oil diffusion pumps 37 are suitably connected to the tank 35 to evacuate the tank to the desired vacuum and to maintain the vacuum. The diffusion pumps 37 (only one of which is illustrated in Fig. 1) are backed by a mechanical pump 38 which is connected thereto by a pipe 39.

To permit isolation of the cyclotron vacuum tank 35 from the remainder of the system, a second safety solenoid valve 41 is connected into the exhaust pipe 42 of the mechanical pump 38. The exhaust pipe 42 is then terminated at a T fitting 43 to provide further connections. One of the remaining openings of the T fitting 43 is connected to another T fitting 44 by a length of pipe 46 having a mechanical valve 47. A pipe 48 having a mechanical valve 49 is connected between one of the other openings of the T fitting 44 and the inlet end of a second charcoal trap 51.

At the outlet of the second trap 51, there is connected a pipe 52 having a T fitting 53 and a mechanical valve 54 and being terminated in another T fitting 56. There is also provided a third charcoal trap 57 connected in parallel with the second trap 51 by a pipe 58 having a mechanical valve 59 extended from the remaining opening of the T fitting 44 to the inlet of the third trap and by a pipe 61 having a T fitting 62 and a mechanical valve 63 extended from the outlet of the third trap to a second opening of the T fitting 56. The second and third traps 51 and 57 are similar in all respects to the first trap 22 and serve to adsorb gases other than helium which are withdrawn from the cyclotron vacuum tank 35.

The remaining opening of the T fitting 56 at the outlet of the traps 51 and 57 is connected by a pipe 66 to another T fitting 67. One opening of such T fitting 67 is connected by a pipe 68 having a mechanical valve 69 to the inlet of a second mechanical pump 71. The outlet of the second mechanical pump 71 is connected by a pipe 72 having a T fitting 73 and a mechanical valve 74 to a second opening of the first storage tank 11. Similarly, the remaining opening of the T fitting 67 is connected by a pipe 76 having a mechanical valve 77 to the inlet of a third mechanical pump 78, the outlet of which is connected by a pipe 79 having a T fitting 81 and a mechanical valve 82 to a second opening of the second storage tank 12. The other openings of the T fittings 73 and 81 at the outlets of the second and third mechanical pumps 71 and 78 are suitably joined with two mechanical valves 83 and 84 with a T fitting 86 connected therebetween. A length of pipe line 87 having a mechanical valve 88 is connected between the remaining openings in the T fittings 86 and 13 in the lines at either end of the storage tanks 11 and 12.

To pump out certain sections of the pipe system described in the foregoing paragraphs, there is provided a fourth mechanical pump 91 with the outlet free at atmospheric pressure. A pipe line 92 having two mechanical valves 93 and 94, one at either hand, is extended from a T fitting 96 at the inlet of the fourth pump 91 to the T fitting 28 at the cyclotron side of the first trap 22. A second pipe line 97 having two mechanical valves 98 and 99, one at either end, is connected between a T fitting 101 which is connected to the T fitting 96 at the inlet of the mechanical pump 91 and the T fitting 62 at the third trap 57. A third pipe line 102 is similarly connected with two mechanical valves 103 and 104, one at either end, between a T fitting 106 connected to the T fitting 101 at the fourth pump 91 and the T fitting 53 at the second trap 51. A fourth pipe line 107 having two mechanical valves 108 and 109, one at either end, is connected from the T fitting 106 at the fourth pump 91 to a T fitting 111 which is, in turn, connected to the T fitting 43 at the second safety solenoid valve 41. The remaining opening of the T fitting 111 is connected to the pressure responsive element (not shown) of a conventional thermocouple gauge 112 having an electrical contactor 113 (see Fig. 2) which is normally open during vacuum conditions in the system.

In the foregoing description the mechanical valves, which are referenced as elements of the system, are preferably of the bellows type, but not limited thereto. Also, reference has been made to piping whereas, in practice, copper tubing has been used and all connections are standard and vacuum tight.

Referring now to the control circuit for the system (see Fig. 2), there is provided a source of commercial electric power (not shown) to which a pair of leads 126 and 127 may be readily connected. The driving motors of the three mechanical pumps 71, 78, and 91 are individually connected between the leads 126 and 127 by fuses 134—136 and single-throw switches 138—140. The diffusion pumps 37 and backing pump 38 are separately controlled in a conventional manner which is not illustrated on the drawing for the purpose of simplicity.

A first relay having a solenoid 146, and at least one normally open contactor 147, is provided with the solenoid connected between the lead 127 and one side of the contactor 113 of the thermocouple gauge 112. The other side of the thermocouple contactor 113 is connected through a single-throw switch 148 and fuse 149 to the other lead 126 to complete the power connections. A second relay having a solenoid 151, a normally open contactor 152, and a normally closed contactor 153 is also provided with the solenoid connected between the lead 127 and one side of the contactor 147 of the first relay. A connection is made from the other side of the contactor 147 to the junction between the switch 148 and the thermocouple contactor 113. So that the control circuit may be tested for operability, a normally open push-button switch 154 is connected in parallel with the contactor 147 of the first relay. As an alarm an electric bell 156 is connected in series with the normally open contactor 152 of the second relay between the lead 127 and the junction of the switch 148 and thermocouple contactor 113. So that the two solenoid valves 32 and 41 are normally closed during operation of the system the solenoids thereof are connected in parallel and such parallel circuit is connected in series with the normally closed contactor 153 of the second relay between the lead 127 and the junction of the switch 148 and thermocouple contactor 113.

With the foregoing control circuit the various vacuum pumps 71, 78, and 91 may be operated individually by means of the switches 138—140. Also, the solenoid valves 32 and 41 may be placed in operation by closing the switch 148 to complete the circuit including the solenoids. During operation of the system, a break in the lines results in an increase in the pressure. The thermocouple gauge 112 is set so that the contactor 113 closes when the pressure increases to a predetermined value. Closure of the thermocouple contactor 113 completes a power circuit through the solenoid 146 of the first relay and so closes the contactor 147. The solenoid 151 of the second relay is then energized to close the contactor 152 and open the contactor 153. Thus the bell is energized to sound an alarm and the circuit of the solenoid valves 32 and 41 is broken and the valves close. Preferably the relays are selected to act in a minimum of time so that the foregoing operation is substantially instantaneous.

For convenience, the operation of the system may be considered as comprising three periods, namely; (1) the initial setup period, (2) the steady-state operation period, and (3) the shutdown period. In the initial setup period the system must be pumped down to the desired degree of vacuum, for example 100 microns, and the traps 22, 51, and 57 filled with liquid nitrogen before any of the gas in the storage tanks 11 and 12 is introduced. With the safety solenoid valves 32 and 41, the needle valve 21, and all mechanical valves closed, the exhaust line 42 of the mechanical backing pump 38 is opened to atmosphere. The diffusion pumps 37 and the backing pump 38 are started to reduce the pressure of the cyclotron tank 35 as well as the ion source 34 and inlet pipe 33.

When the pressure has been reduced to substantially the running pressure of the cyclotron 36, the exhaust line 42 of the backing pump 38 is connected to the system. At this point in the operation of the system the control (not shown) of the pressure sensitive element of the thermocouple gauge 112 should be adjusted so that high pressure in the system side of the solenoid valve 41 does not prevent opening of such valve. In such manner then the electrical switch 140 may be closed to start the fourth mechanical pump 91 and the mechanical valves 108 and 109 in the line 107 leading from the solenoid valve 41 to the pump may be opened to pump down such line 107 and provide a path to atmosphere for the exhaust of the backing pump 38. Next, the traps 22, 51, and 57 should be suitably evacuated and this is accomplished by opening the appropriate mechanical valves in the lines 92, 102, and 97, respectively, leading from the traps to the inlet of the fourth mechanical pump 91. Liquid nitrogen should now be added to the jackets of the traps 22, 51, and 57 and sufficient time allowed for a thermal equilibrium to be reached. Following the foregoing the remainder of the mechanical valves are opened with the exception of the valves 16 and 74 which isolate the first storage tank 11, the valves 18 and 82 which isolate the second storage tank 12, and the needle valve 21. The latter procedure permits all sections of the cyclotron 35 and the system to be pumped down to the same pressure.

Having accomplished a substantially uniform pressure throughout the system the mechanical valves 69, 83, 77, and 84 at the inlets and outlets of the second and third mechanical pumps 71 and 78 are closed, as well as the valves 59 and 63 at either side of the third trap 57. Now, to isolate the system from the atmosphere it is necessary to close the valves in the lines 92, 97, 102, and 107 leading to the fourth pump 91.

To accomplish a circulation of gas it is necessary to start either the second or third mechanical pump 71, 78, following which the mechanical valve 69 or 77 at the intake of the pump is opened. For convenience, let it be assumed that the second pump 71 has been started and the valve 69 opened. To place the control circuit in operation to suitably govern the position of the safety solenoid valves 32 and 41, it is necessary to adjust the pressure-sensitive element of the thermocouple gauge 112 for the predetermined value of pressure. The mechanical valve 83 at the exhaust of the second pump 71 is opened so that only the needle valve 21 is closed in the circuit. Finally the mechanical valve 16 at the first storage tank 11 is opened and the needle valve 21 is adjusted to that open position where a suitable gas flow occurs and sufficient helium is in the circulating system to assure a maximum beam current in the cyclotron. After a steady state has been reached the storage tank 11 is sealed off from the system by closing the mechanical valve 16.

In accordance with the foregoing then helium gas to be ionized passes through the needle valve 21 to the first trap 22 where contaminants, such as oil vapor and other gases, are removed by the charcoal 24 at low temperature. From the first trap 22 the helium passes to the ion source 34 of the cyclotron 36. The unused helium is then pumped out of the cyclotron tank 35 by the diffusion pumps 37 and passed to the second trap 51 (which is in use) by the backing pump 38. The second trap 51 serves principally to remove gas contaminants and permits only the helium to pass. The second mechanical pump 71, which is in operation, continues the circulation of the helium from the second trap 51 through the line 87 which by-passes the storage tank 11 back to the first trap 22. Thus, there is a closed and continuous path for circulating helium.

If during operation in the foregoing manner the pressure in the system starts to rise slowly, the probable cause is that the second charcoal trap 51 has become saturated. In such instance it is necessary to switch to the third charcoal trap 57 which is in parallel with the second trap 51. In the switch-over procedure it is necessary to first be certain that the third trap 57 is at low pressure and in thermal equilibrium with the liquid nitrogen in the jacket. Next the helium in the second trap 51 is pumped out by closing the fore mechanical valve 49, following which the after valve 54 is closed to seal off the second trap from the system. The third trap 57 may then be connected into the system by opening the valves 59 and 63 at either side of the trap.

To recondition the saturated second trap 51 the valves 103 and 104 in the line 102 between the trap and the fourth mechanical pump 91 are opened after the pump has been started. Then the liquid nitrogen in the jacket of the trap 51 is removed and a heating jacket placed thereabout to raise the temperature of the charcoal and drive out the trapped contaminants. Following the reconditioning procedure the second trap 51 is sealed off again by closing the valves 103 and 104 in the line 102 and turning off the pump 91 so that the trap is ready for service at a later time.

Now, as stated previously, should a leak occur in the system and the pressure increase rapidly to the level at which the pressure sensitive element of the thermocouple gauge 112 has been set, the control circuit of Fig. 2 operates to close the safety solenoid valves 32 and 41 and sound an alarm. In such instance as much of the helium as possible may be pumped back into the storage tank 11, from which it originated, in accordance with the close-down procedure to be set out hereinafter.

Consider now the shutdown period and particularly the close-down procedure to be used when the system has been operating satisfactorily. First the mechanical valve 83 at the exhaust of the second mechanical pump 71 (which is operating) is closed and the needle valve 21 opened fully. In this manner the helium in the circulatory system is pumped into the exhaust line 72 of the second pump 71 and may be stored by closing the mechanical valve 69 at the inlet side of the pump.

At this point it is to be noted that gas from the second storage tank 12 may be introduced in the manner outlined above for storage tank 11. Also, when tank 12 is used the third mechanical pump 78 is operated with the second pump 71 properly sealed off from the system.

If desired, the gas from the system, taken from the first storage tank 11 may be pumped back into the tank and the tank then sealed off. After the gas has been isolated, either in the appropriate storage tank 11 or in the exhaust line of the second pump 71, the various lines may be pumped down by suitable manipulation of the valves and operation of the fourth mechanical pump 91 as outlined in the foregoing paragraphs. After such pump down procedure the valves may all be closed and the system is then ready for operation again.

Thus, there has been described a system for gas recirculation and recovery which is efficient and flexible. It will be readily apparent that the use of the invention is not limited to a cyclotron of the type set forth, but may be used in any application of gas circulation where recovery of the gas is desirable and vacuum conditions prevail in the system.

While the salient features of the present invention have been described in detail with respect to one embodiment it will be apparent that numerous modifications may be made within the spirit and scope of the invention, and it is therefore not desired to limit the invention to the exact details shown except insofar as they may be defined in the following claims.

What is claimed is:

1. In a recirculating and recovery system for a cyclotron having a vacuum tank with a filamentary ion source therein, the combination comprising a gas storage tank, means including at least two valves connected between said storage tank and said ion source, such valves disposed to provide a first isolation section, evacuating means having an intake and an exhaust with the intake connected to said vacuum tank, a gas purifying means, means including at least two valves connected between the exhaust of said evacuating means and said gas purifying means, such valves disposed to provide a second isolation section, a pump having an input and an output with the input connected to said gas purifying means by a connecting means including at least one valve and with the output connected to said storage tank by a connecting means including a valve, a by-pass line connected around said storage tank and including valve means, and a vacuum pump having an exhaust at atmospheric pressure and an intake selectively connected to said first and second isolation sections and to the pump side of said gas purifying means by separate pipe and valve assemblies.

2. In a recirculating and recovery system for a cyclotron having a vacuum tank with a filamentary ion source therein, the combination comprising a gas storage tank, means including at least two spaced-apart mechanically-operated valves and a solenoid-operated valve connected between storage tank and said ion source, such mechanically-operated valves disposed to provide a first isolation section, evacuating means having an intake and an exhaust with the intake connected to said vacuum tank, a gas purifying means, means including at least two spaced-apart mechanically-operated valves and a solenoid-operated valve connected between the exhaust of said evacuating means and said gas purifying means, such mechanically-operated valves disposed to provide a second isolation section, a pump having an input and an output with the input connected to said gas purifying means by a connecting means including at least one valve and with the output connected to said storage tank by a connecting means including a valve, a by-pass line connected around said storage tank and including at least one valve, a vacuum pump having an exhaust at atmospheric pressure and an intake selectively connected to said first and second isolation sections and to the pump-side of said gas purifying means by separate pipe and valve assemblies, and an electrical control circuit connected to said solenoid valves to close such valves in response to a selected pressure.

3. In a gas recirculating and recovery system for a cyclotron having a vacuum tank with a filamentary ion source, the combination comprising a gas storage tank, a first gas purifying means, means including a needle valve connected between said first gas purifying means and said storage tank, means including at least two spaced-apart mechanically-operated valves and a solenoid-operated valve connected between said first gas purifying means and said ion source, such mechanically-operated valves disposed to provide a first isolation section, evacuating means having an intake and an exhaust with the intake connected to said vacuum tank, a second gas purifying means, means including at least two spaced-apart mechanically-operated valves and a second solenoid-operated valve connected between the exhaust of said evacuating means and said second gas purifying means, such mechanically-operated valves disposed to provide a second isolation section, a pressure responsive relay connected between said second solenoid-operated valve and adjacent mechanically-operated valve, a pump having an input and an output with the input connected to said second gas purifying means by a connecting means including at least one valve and with the output connected to said storage tank by a connecting means including a valve, a by-pass line connected around said storage tank and including at least one valve, a vacuum pump having an exhaust at atmospheric pressure and an intake selectively connected to said first and second isolation sections and to the pump side of said second gas purifying means by separate pipe and valve assemblies, and an electrical circuit connected to said pressure responsive relay and to said first and second solenoid valves to close such valves at a selected pressure.

4. The combination of claim 3 wherein the pressure responsive relay is further characterized as having a normally-open contactor with means to close such contactor at a selected pressure and the electrical control circuit is further characterized as comprising a first relay having a solenoid connected to energize upon the closure of said contactor, a second relay connected to energize in response to energization of said first relay, said first and second solenoid valves and an alarm bell connected to contactors of said second relay to operate in response to energization of said second relay.

5. In a helium recirculating and recovery system for a cyclotron having a vacuum tank with a filamentary ion source, the combination comprising a helium storage tank, a first purifying trap having activated charcoal with a liquid nitrogen cooling jacket, piping means including a mechanically-operated valve and a needle valve in such order connected between said storage tank and said first purifying trap, piping means including a mechanically-operated valve and a first solenoid-operated valve connected between said first purifying trap and said ion source, evacuating means having an intake and an exhaust with the intake connected to said vacuum tank, a second purifying trap similar to said first purifying trap, piping means including a second solenoid-operated valve and at least one mechanically-operated valve connected between the exhaust of said evacuating means and said second purifying trap, a pressure responsive relay connected between said second solenoid-operated valve and the adjacent mechanically-operated valve, a pump having an input and an output with the input connected to said second purifying trap by piping means including at least one mechanically-operated valve and with the output connected to said storage tank by piping means including a mechanically-operated valve, a by-pass line including at least one mechanically-operated valve connected between the output of said pump and the storage tank side of said needle valve, a vacuum pump having an intake and an exhaust with the exhaust at atmospheric pressure, piping means including a mechanically-operated valve at either extremity connected between the intake of said vacuum pump and the side of said second solenoid valve away from said evacuating means, piping means including a mechanically-operated valve at either extremity connected between the intake of said vacuum pump and the pump side of said second purifying trap, piping means including a mechanically-operated valve at either extremity connected between the intake of said vacuum pump and the ion source side of said first purifying trap, and an electrical control circuit responsive to said pressure responsive relay and including the solenoids of said solenoid-operated valves to close such valves at a preselected value of pressure.

References Cited in the file of this patent
UNITED STATES PATENTS

| | | |
|---|---|---|
| 2,442,493 | Heyn | June 1, 1948 |
| 2,615,129 | McMillan | Oct. 21, 1952 |
| 2,643,525 | Cartier | June 30, 1953 |
| 2,665,769 | Walker et al. | Jan. 12, 1954 |